United States Patent [19]

Burge

[11] Patent Number: 5,024,468
[45] Date of Patent: Jun. 18, 1991

[54] PUSH-IN TUBE FITTING AND RELEASE TOOL

[75] Inventor: Donald G. Burge, Plainwell, Mich.

[73] Assignee: Parker Hannifin Corporation, Cleveland, Ohio

[21] Appl. No.: 434,194

[22] Filed: Nov. 13, 1989

[51] Int. Cl.⁵ .............................................. F16L 35/00
[52] U.S. Cl. ...................................... 285/39; 285/308
[58] Field of Search ................. 285/39, 308, 315, 331, 285/322, 323, 110

[56] References Cited

U.S. PATENT DOCUMENTS

| 2,631,872 | 3/1953 | Wurmser | 285/39 X |
| 4,087,120 | 5/1978 | Rumble | 285/308 X |
| 4,138,146 | 2/1979 | Rumble | 285/308 X |
| 4,927,185 | 5/1990 | McNaughton | 285/308 X |

FOREIGN PATENT DOCUMENTS 2503550 9/1975 Fed. Rep. of Germany ...... 285/308

Primary Examiner—Dave W. Arola
Attorney, Agent, or Firm—Christopher H. Morgan

[57] ABSTRACT

The invention comprises a metal push-in tube fitting and a release tool. The metal tube fitting includes a body with a tube-receiving cavity in one end. A tube support forms the inside of the cavity and supports the tube against inward movement. A gripper ring having a radially inner gripping edge is disposed in the cavity and grips a tube inserted in the cavity through the ring. A retainer holds the gripper ring in the body of the tube fitting. A release tool is provided for releasing a tube which is held by the gripper ring of the fitting. The release tool has a thin, cylindrical section portion which can be received about a tube held in the fitting and then inserted in the fitting to raise the gripper and release the tube.

7 Claims, 3 Drawing Sheets

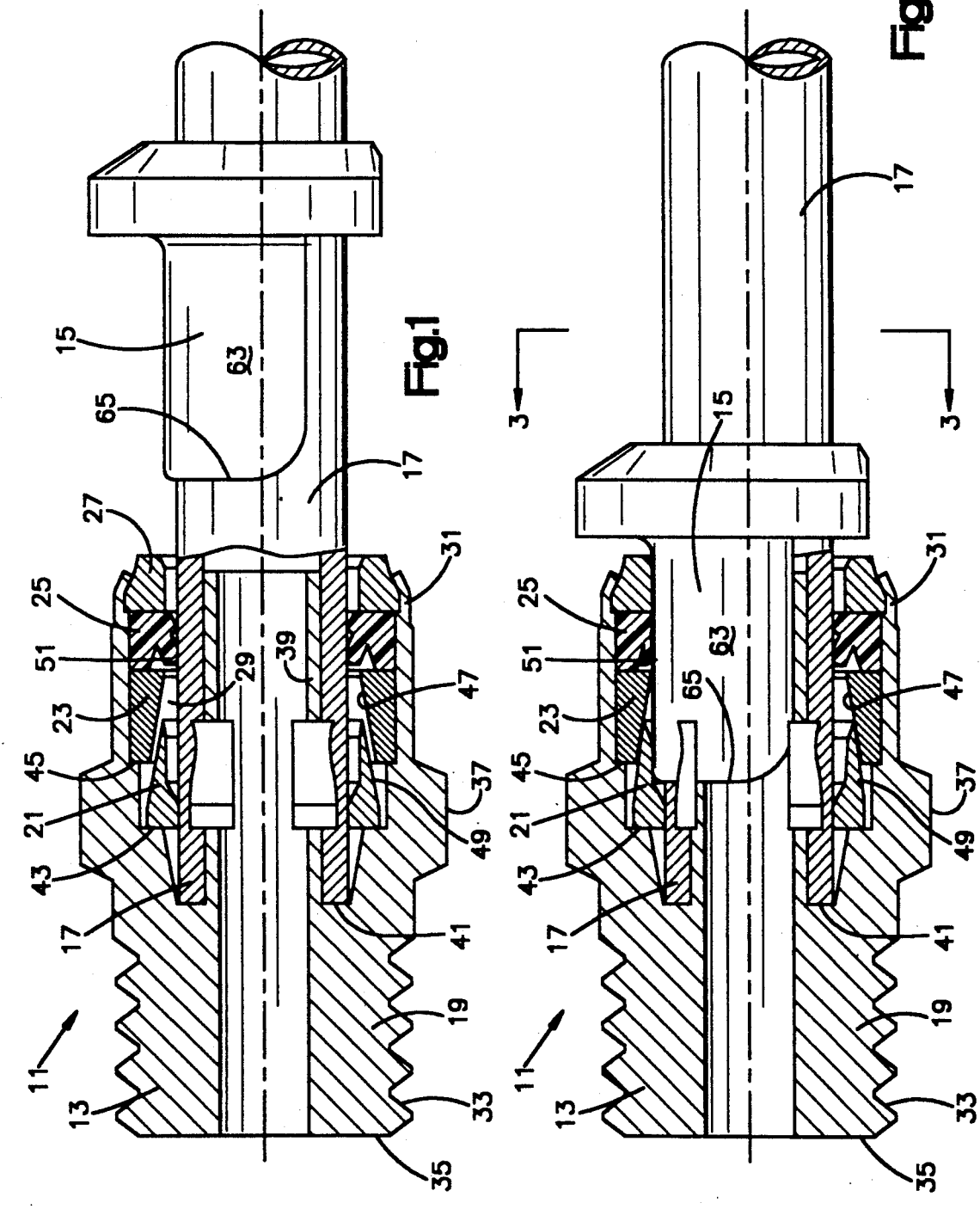

PUSH-IN TUBE FITTING AND RELEASE TOOL

BACKGROUND OF THE INVENTION

1. Field of the Invention

The present invention relates in general to tube fittings and, more particularly, to metal tube fittings of the type suitable for use in air brakes.

2. Description of the Prior Art

Tube fittings for air brakes are generally formed of metal such as brass. Metal is required because of the more rigorous and extreme conditions encountered by the tube fitting and the requirement of higher reliability. Brass is preferred over steel since it is necessary that n rust be present in the air brake lines which provide pneumatic power to the brakes of the vehicles on which they are installed.

Generally the tubes which are connected to air brake fittings are made of nylon strengthened by a braided sheath and covered with a nylon exterior coating. Such tubes are capable of providing the strength, flexibility and wear resistance needed for this extreme condition usage. Metal fittings, more particularly brass fittings, are well suited to connect to this type of tubing.

Among the extreme conditions encountered by the air brake tube fittings are extreme high and extreme low temperatures. Vibration and higher tensile loads are also commonly encountered. It is difficult to provide a fitting which has a convenient means of coupling with tubing which, nevertheless, is reliable in these difficult conditions.

Although brass air brake tube fittings have been in use for many years, only relatively recently have such tube fittings been developed which utilize the convenient push-in method of coupling the tube fitting. By push-in tube fitting it is meant that the only requirement for coupling and sealing a tube in connection with the tube fitting is that the tube be pushed into the tube fitting. It is not necessary to tighten nuts or screws or the like.

It is especially difficult to create such a push-in tube fitting which has the capability of releasing the tube if it is desired to change the tube. Changing the tubing is required, for example, if the tubing becomes cut or begins to wear or is otherwise likely to leak.

Because of the requirement of high reliability, it is even more difficult to provide such a releasable, push-in, air brake tube fitting which is simple in its construction so as to be more reliable. Simplicity of construction is especially critical due to the dirt and vibration which would damage or destroy more complex designs.

SUMMARY OF THE INVENTION

It is accordingly an object of the present invention to provide an improved push-in tube fitting and release tool for releasably receiving and retaining a tube. It is also an object to provide such a tube fitting design which is suitable for use in an air brake application.

In accordance with these objects the present invention provides an improved tube fitting and release tool comprised of a metal body, preferably made of brass. The body has a first end for connection to a fluid conduit and a second end for connection to a tube. In the second end of the body is a cavity for receiving a tube therein. A cylindrical tube support is disposed within the tube receiving cavity for extending within and supporting a tube received in the cavity. A fluid conduit extends through the body from the first end of the body through the tube support. A gripper ring is disposed in the tube receiving cavity of the body radially outside of the tube support. This ring has a radially inner edge which grips a tube once it is inserted in the cavity and through the ring. The body also has a means for retaining the gripper ring in the cavity.

In addition to the fitting the present invention includes a mating release tool which has a thin, cylindrical-section portion for being inserted between the gripper ring and a tube gripped by the gripper ring so that a tube can be thereby released from the gripper ring and removed from the tube fitting. Preferably the release tool has a longitudinal opening therein for receiving a tube therethrough so that the tool can be placed about a tube retained in the body and then inserted between the gripper ring and the tube to release the tube.

Preferably the gripper ring is formed of brass so that it is compatible with the body and provides consistent responses to vibration, temperature and other disturbing conditions. Also, it is preferable that the gripper ring have a split ring shape to allow the elastic radial movement of the inner edge of the gripper ring to release a tube extending therethrough in response to the release tool being inserted between the gripper ring and the tube extending therethrough.

For a further understanding of the invention and further objects, features and advantages thereof, reference may now be had to the following description taken in conjunction with the accompanying drawings.

DESCRIPTION OF THE DRAWINGS

FIG. 1 is a cross-sectional view of a tube fitting constructed in accordance with the present invention taken along the lines shown in FIG. 3.

FIG. 2 is a cross-sectional view of the device shown in FIG. 1 taken along the lines shown in FIG. 3 with the parts in a release position.

DESCRIPTION OF PREFERRED EMBODIMENTS

Figure 3:
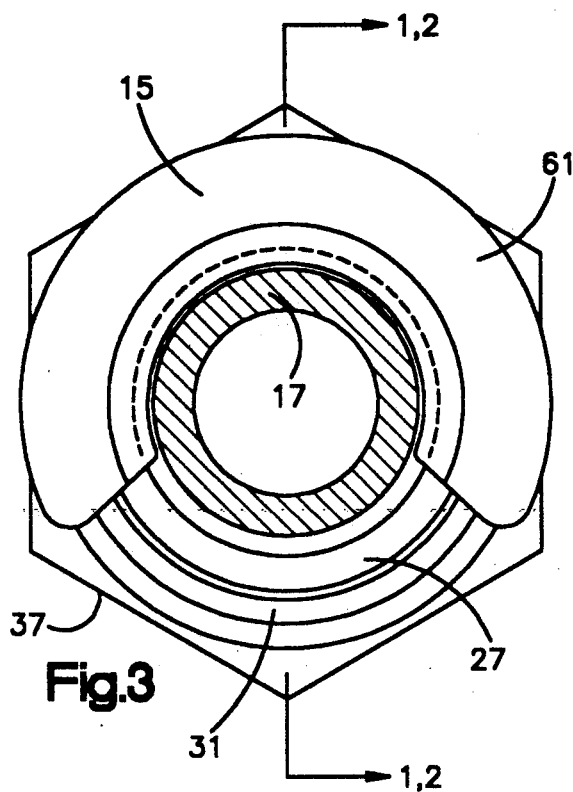
FIG. 3 is a cross-sectional view of the device shown in FIG. 2 taken along the lines shown in FIG. 2.

Referring now to FIGS. 1 through 6 the improved tube fitting and release tool of the present invention are shown generally at 11. The device 11 includes a tube fitting 13 and a release tool 15. The tube fitting 13 is a push-in type tube fitting which can connect to a tube 17 when the end of the tube 17 is pushed into the fitting 13. The release tool 15 is provided to allow the tubing 17 to be released from the fitting 13 after the release tool 15 is inserted into the fitting 13 as shown in FIG. 3.

The fitting 13 is comprised of a body 19, a split ring gripper 21, a gripper retainer 23, a seal ring 25 and a seal retainer 27. The split ring gripper 21, the gripper retainer 23, the seal ring 25 and the seal retainer 27 are all disposed in an annular cavity 29 disposed in the tube end 31 of the body 19.

The body 19 is generally cylindrical in shape and has threads 33 on the exterior of the body at the threaded end 35 opposite the tube end 31. The body 19 can be formed from hexagonal brass bar stock on a standard turning machine. The male threads 33 can be threaded into mating female threads in a frame or the like. In this manner the tube fitting 13 serves as a connection between a fluid conduit in the frame and a tube such as tube 17. A nut 37 is formed on the exterior of the body 19 midway between the tube end 31 and the threaded end 35. The nut 37 allows a wrench to be used to tighten the fitting 13 into the frame or the like.

Although FIGS. 1 through 8 illustrate a straight body tube fitting, the concepts of the present invention can also be used to form tube fittings in Tee and Elbow shapes. Generally, tube fittings of this type used in air brake systems attach to tubing sized from ¼ inch to ⅜ inch outside diameter. The wall thickness ranges from 0.040 to 0.092 inches.

Extending within the cavity 29 on the tube end of the body 19 is a cylindrical tube support 39. The tube support 39 forms the radially inner wall of the annular cavity 29. The tube support 39 is sized so that a tube 17 will fit closely about the tube support 39 and be supported thereby as it is inserted into the cavity 29. This support is especially important since the pressure of the split ring gripper 21 on the tube 17 would otherwise would deform the tube sufficiently to allow it to slip from the fitting 13. The tube support 39 also protects the connection between the tubing 17 and the fitting 13 against radial stresses on the tubing 17 beyond the tube end 31.

The annular cavity 29 extends from the extreme tube end 31 of the fitting body 19 to a tube stop 41 located slightly past the midpoint of the fitting in the direction of the threaded end 35. At the tube stop 41 the width of the annular cavity 29 is slightly wider than the wall of the tube 17 and tapers toward the tube stop 41 to guide the end of the tube 17 as it is inserted to the tube stop. The cavity 29 then widens at a first shoulder 43 to an opening sufficiently large to receive the split ring gripper 21 in its expanded shape so as not to engage tube 17. This expanded shape is achieved when the release tool 15 is used (see FIG. 2). The shoulder 43 serves as a stop to prevent further movement of the split ring gripper 21 in the direction of the threaded end 35 of the body 19. Tube shoulder 43 is located from about 0.15 to about 0.3 inches past tube stop 41.

The cavity 29 of body 19 then widens further at a shoulder 45 to an opening wide enough to receive the gripper retainer 23. The gripper retainer 23 has an inclined interior wall 47 which mates with a similarly inclined exterior wall 49 of the split ring gripper 21. These two inclined mating surfaces cooperate so that as the split ring gripper 21 moves toward the tube end 31 of the body 19 the split ring gripper moves radially inwardly to increase the grip on a tube 17 extending through the split ring gripper 21. The shoulder 45 serves as a stop to prevent further movement of the gripper retainer 23 in the direction of the threaded end 35 of the body 19.

The seal ring 25 is disposed in the cavity 29 adjacent the gripper retainer 23. The seal ring 25 has a v-shaped portion with a radially inner leg 51 being positioned so that it is deformed outwardly as the tube 17 is inserted into the tube fitting 13. The remainder of the seal ring 25 fills the portion of the cavity 29 between the gripper retainer 23 and the seal retainer 27. In this manner, the seal ring 25 seals the tube 17 against leakage which might otherwise occur around the exterior of the tube support 39 and the exterior of the tube 17.

The seal retainer 27 serves to retain the seal ring 25, the gripper retainer 23 and the split ring gripper 21 in the cavity 29. The seal retainer 27 is held in position by crimping the extreme end of the body 19 over the curve radially outer portion of the seal retainer 27 so that it is held firmly in place with respect to the body 19.

Assembly of the fitting 13 is achieved by inserting the split ring gripper 21 into the cavity 29 to its stop shoulder 43. Next the gripper retainer 23 is inserted to its stop 45. Then the seal ring 25 is inserted to its stop against the gripper retainer 23. Finally, the seal retainer 27 is inserted against the seal ring 25 and the end 31 of the body 19 is crimped around the seal retainer 27.

Figure 4:
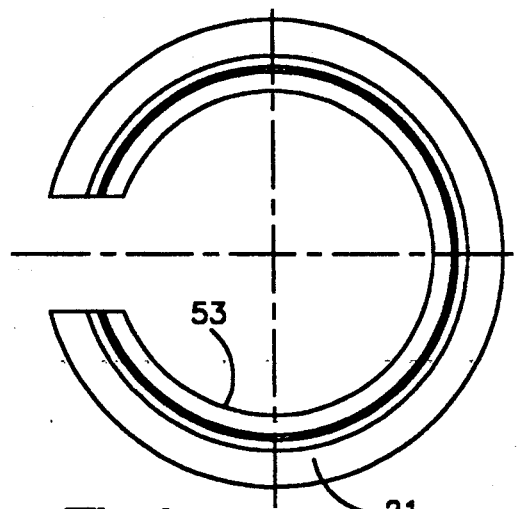
FIG. 4 is an end view of a portion of the device shown in FIG. 1.
Figure 5:
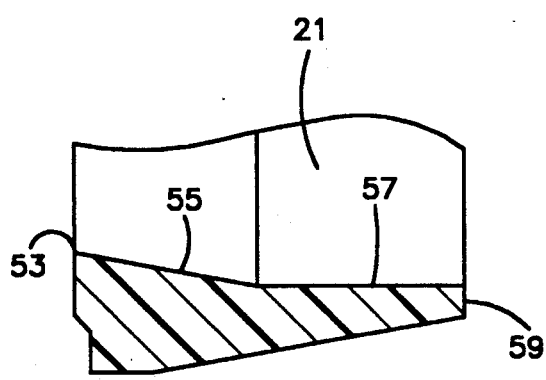
FIG. 5 is a cross-sectional view of a portion of the piece shown in FIG. 4 taken along the lines shown in FIG. 4.

Referring to FIGS. 4 and 5 the split ring gripper 21 is shown in more detail. It can be seen that the split ring gripper 21 has a sharp gripping edge 53 at its extreme rear end. An inclined radially inner surface 55 extends from this edge 53 to approximately the midpoint of the gripper 21. A cylindrical (no incline) surface 57 extends from the inclined surface 55 to the front end 59 of the split ring gripper 21. The front end 59 can be chamfered to improve the ability of the release tool to be received therein.

The inclined surface 55 has an incline of between about five degrees to about thirty degrees. This inclined surface 55 serves to open or elastically expand the split ring collet when tube 17 is inserted therethrough. It also serves to control the amount of "bite" of the edge 53 into the tubing 17.

It has been found that the preferred angle of the inclined surface 55 is about ten degrees. This angle provides the optimum amount of bite into the tubing 17.

It has also been found that the diameter of the split ring gripper 21 at the surface 57 must not be less than 0.030 inches larger nor more than 0.200 inches larger than the diameter of the split ring gripper 21 at edge 53.

In order to meet the various requirements for air brake systems, the body 19, the split ring gripper 21 and the gripper retainer 23 must all be formed of brass. It is especially important that the split ring gripper 21 be formed of a brass alloy having sufficient elasticity and hardness. It is preferred that the split ring gripper be formed of UNS C34500 brass alloy which has been drawn to a Rockwell hardness of 75 to 80 on the B scale.

Figure 6:
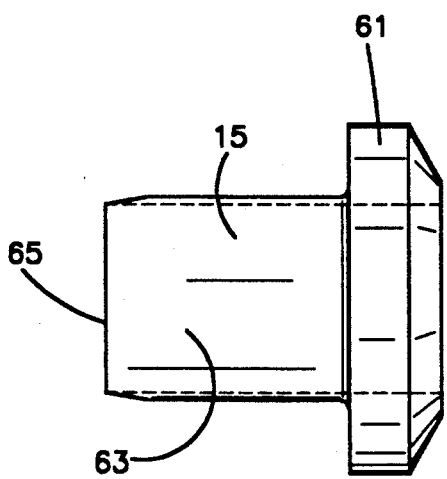
FIG. 6 is a plan view of a portion of the device shown in FIG. 1.

Referring now to FIG. 6 as well as FIGS. 1 through 3, the release tool 15 can be seen. The release tool has a flange 61 intended for manual grasping and a thin walled insertion section 63 extending from the flange 61. The insertion section 63 has a semi-cylindrical shape. By semi-cylindrical it is meant that the portion 63 is cylindrical except that a longitudinal section has been removed. The flange 61 also has a generally semi-cylindrical shape.

The thin walled insertion section 63 is sufficiently long so that the leading edge 65 will extend to the end of surface 57 but will not engage the inclined surface 55 when the release tool 15 is fully inserted in the fitting 13. When fully inserted, the flange 61 will contact the seal retainer 27. The release tool 15 can, thus, be easily held in position for releasing the tube 17.

The thin walled section 63 has a thickness of about 0.020 inches. The leading edge 65 of the release tool 15 has an inclined surface 66 which helps the thin wall section to be inserted under the seal ring 25 and split ring gripper 21. Preferably, the incline of this surface 66 is about 5 to about 45 degrees, and most preferably, about 10 degrees. This incline also improves the ease with which the split ring gripper 21 can be disengaged from tube 17.

The operation of releasing the tube 17 can be performed after the tube 17 is inserted in the fitting 13 by placing the release tool 15 onto the tube 17. The longitudinal opening in the insertion portion 63 is just wide enough to receive the tube 17 therethrough. Then the release tool is inserted fully into the fitting so that leading edge 65 of the insertion portion 63 raises the split ring gripper 21 so that it no longer bites into the tubing 17. The release tool 15 is then held in its fully inserted position while the tubing 17 is removed.

Figure 8:
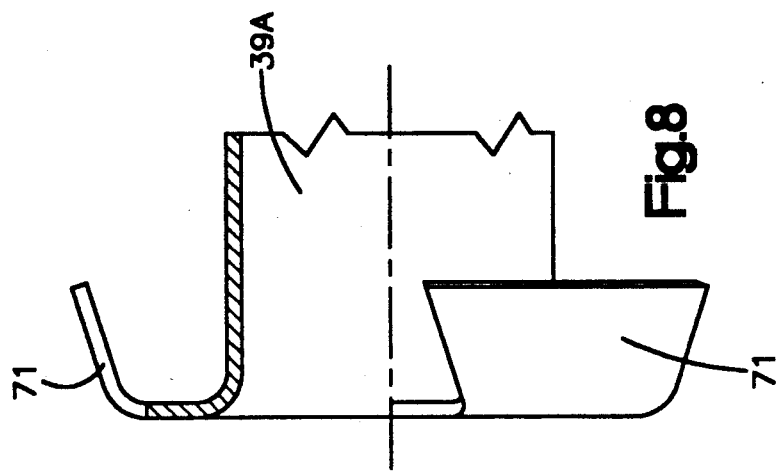
FIG. 8 is a partial cross-sectional view of a portion of the device shown in FIG. 7.
Figure 7:
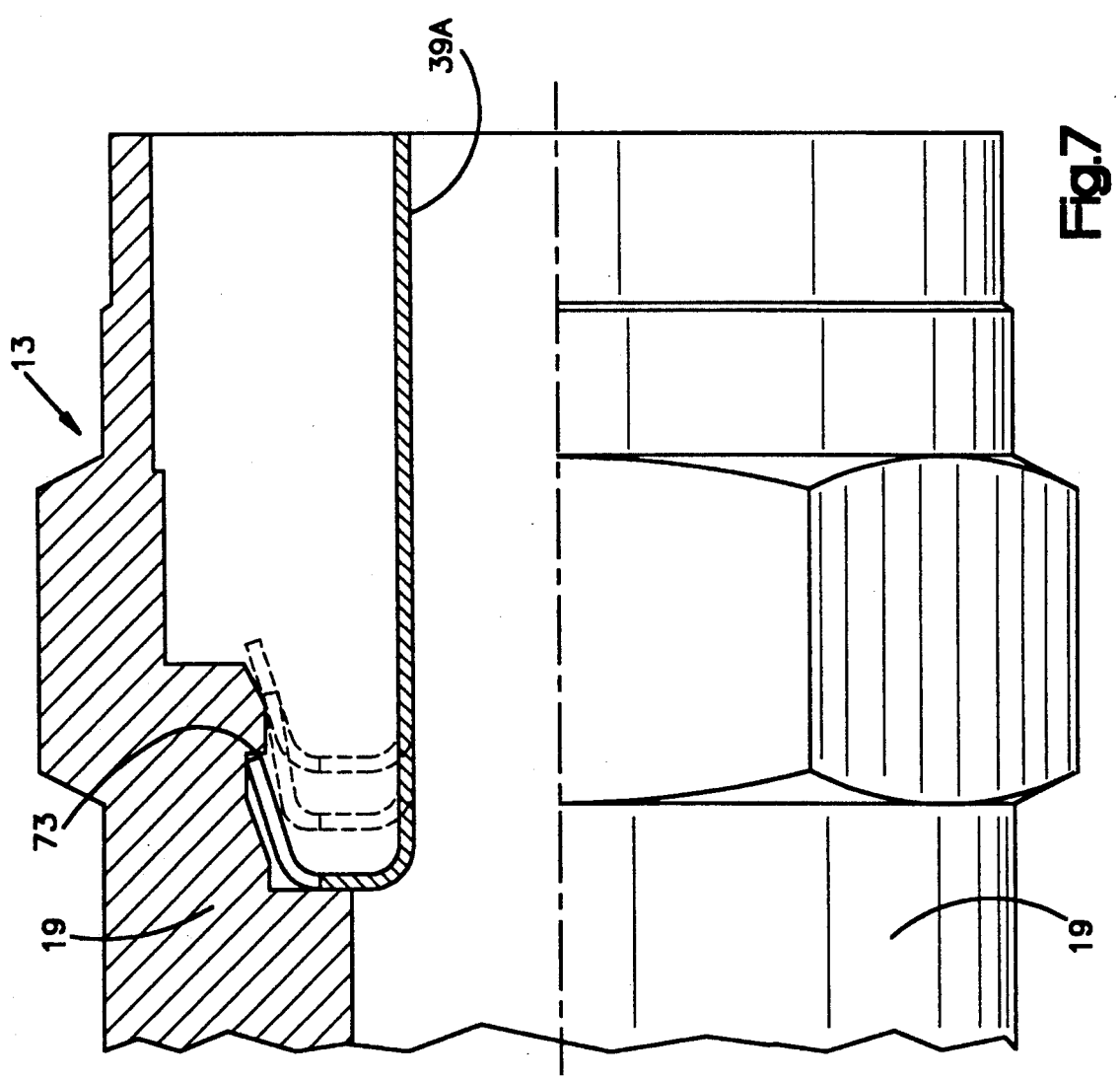
FIG. 7 is a cross-sectional view of an alternate embodiment of a portion of the device shown in FIG. 1.

An alternate embodiment of the present invention is shown FIGS. 7 and 8. In this embodiment the body 19 of the fitting 13 does not have an intricately formed tube support 39. Rather, a tube support 39A is formed as a separate piece and inserted into the body 19. The separate tube support 39A has an outwardly extending lip 71 which is received in the tube stop end of the cavity 29. The lip 71 can be snapped into a rearwardly facing shoulder 73 to hold the tube support 39A in position in the body 19. Alternatively, the outer edge of the lip 71 can be sharp so as to bite into a cylindrical surface without a shoulder at the position where shoulder 73 is shown. Under either embodiment, the tube support 39A then forms a similar structure to that shown in FIG. 1 to receive the same elements which are illustrated in FIG. 1. The operation of the tube fitting constructed in accordance with the embodiment shown in FIGS. 7 and 8 is the same as shown in FIGS. 1 through 6.

The tube support 39A is shown in FIGS. 7 and 8 with a slotted lip 71. This slotting improves the ability of the lip to deform inwardly as it is inserted in body 19 as shown in slotted line in FIG. 7. However, if the wall thickness of lip 71 is sufficiently thin, slots would not be required.

The tube support 39A can be formed of stainless steel or a material of similar hardness, resiliency and corrosion resistance. One advantage of using this material for the tube support 39A is that the edges of the lip 71 will bite into the softer brass material of body 19. This improves the rigidity of the junction.

Thus, the push-in tube fitting and release tool the present invention are well adapted to achieve the objects and advantages mentioned as well as those inherent therein. It will be appreciated that the instant specifications and claims are set forth by way of illustration and not of limitation, and that various changes and modifications may be made without departing from the spirit and scope of the present invention.

What is claimed is:

1. An improved push-in tube fitting and release tool for releasably receiving and retaining a tube, comprising:

a metal body having:
      a first end for connection to a fluid conduit;
      a second end for connection to a tube;
      a cavity disposed in second end of said body for receiving a tube therein;
      a cylindrical tube support disposed within said tube receiving cavity for extending within and supporting a tube received in said cavity; and
      a fluid conduit extending through said body from said first end of said body through said tube support;
   a split gripper ring disposed in said cavity of said body radially outside of said tube support, said ring having a sharp, radially inner edge which bites into a tube once it is inserted in said cavity and through said ring; said split gripper ring provided with a cylindrical inner surface axially spaced from and having a larger inner diameter than said inner edge and oriented toward said first end and being connected to said inner edge by an inclined surface;
   means for retaining said gripper ring in said cavity; and
   a release tool free of attachment to said body having a thin, cylindrical-section portion for being inserted between said gripper ring inner cylindrical surface and a tube gripped by said gripper ring to engage said inner cylindrical surface and to expand said gripper ring so that a tube can be thereby released from said gripper ring and removed from said tube fitting, said release tool having a length such that, when fully inserted, said cylindrical section portion does not extend between said sharp, radially inner edge of said ring and a tube retained in said body.

2. The tube fitting and release tool of claim 1 wherein said release tool has a longitudinal opening therein for receiving a tube therethrough so that said tool can be placed about a tube retained in said body and then inserted between said gripper ring and a tube to release the tube.

3. The tube fitting and release tool of claim 2 wherein said cylindrical section portion of said release tool has an inclined leading edge for engaging said inner cylindrical surface for disengaging said gripper ring from a tube retained in said body.

4. The tube fitting and release tool of claim 3 wherein said tube fitting is formed of machined brass.

5. The tube fitting and release tool of claim 4 wherein said gripper ring inclined surface has an incline of about 5 degrees to about 30 degrees.

6. The tube fitting and release tool of claim 5 wherein said gripper ring inclined surface has an incline of about 10 degrees.

7. The tube fitting and release tool of claim 6 wherein said release tool has a length so that, when fully inserted to release a tube retained in said body, said leading edge of said cylindrical section portion of said release tool does not engage said inclined surface of said gripper ring.

* * * * *